US005803491A

United States Patent [19]
Barnes et al.

[11] Patent Number: 5,803,491
[45] Date of Patent: Sep. 8, 1998

[54] SUPPLEMENTAL INFLATABLE RESTRAINT DISABLING SYSTEM

[75] Inventors: William Joseph Barnes, Waterford; Lenore Walczak Kolhoff, Fenton, both of Mich.

[73] Assignee: General Motors Corporation, Detroit, Mich.

[21] Appl. No.: 808,751

[22] Filed: Feb. 28, 1997

[51] Int. Cl.⁶ ................................................ B60R 21/32
[52] U.S. Cl. ................... 280/735; 296/68.1; 297/344.1; 340/438
[58] Field of Search ................................ 280/735, 734, 280/732, 730.1, 728.1; 296/68.1; 297/344.1; 340/438

[56] References Cited

U.S. PATENT DOCUMENTS

| | | | |
|---|---|---|---|
| 4,985,835 | 1/1991 | Sterler et al. | 701/46 |
| 5,067,744 | 11/1991 | Hirabayashi | 280/734 |
| 5,071,160 | 12/1991 | White et al. | 280/735 |
| 5,074,583 | 12/1991 | Fujita et al. | 280/735 |
| 5,118,134 | 6/1992 | Mattes et al. | 280/735 |
| 5,172,790 | 12/1992 | Ishikawa et al. | 180/268 |
| 5,184,845 | 2/1993 | Omura | 280/735 |
| 5,205,582 | 4/1993 | Shiga et al. | 280/735 |
| 5,232,243 | 8/1993 | Blackburn et al. | 280/735 |
| 5,544,914 | 8/1996 | Borninski et al. | 280/735 |
| 5,670,853 | 9/1997 | Bauer | 280/728.1 |

FOREIGN PATENT DOCUMENTS

| | | | |
|---|---|---|---|
| 38 02 159 | 8/1989 | Germany | 280/735 |
| 94/22693 | 10/1994 | WIPO | 280/735 |

*Primary Examiner*—Peter C. English
*Attorney, Agent, or Firm*—Kathryn A. Marra

[57] ABSTRACT

A disabling system is provided for a supplemental inflatable restraint system in a vehicle. The disabling system includes a seat movable forward and rearward in the vehicle. The seat has a predetermined seat position. The disabling system automatically disables the supplemental inflatable restraint system when the seat is moved forward of the predetermined seat position and automatically enables the supplemental inflatable restraint system when the seat is moved rearward of the predetermined seat position. In a preferred form of the invention, the predetermined seat position occurs when the seat is fully forward in the vehicle such that the supplemental inflatable restraint system is automatically disabled when the seat is at the fully forward position.

13 Claims, 3 Drawing Sheets

5,803,491

SUPPLEMENTAL INFLATABLE RESTRAINT DISABLING SYSTEM

TECHNICAL FIELD

This invention relates to a supplemental inflatable restraint (SIR) system for use in vehicles and more particularly to a system for disabling the SIR system based on seat position.

BACKGROUND OF THE INVENTION

It is well known in the prior art to provide a supplemental inflatable restraint (SIR) system for the protection of vehicle occupants. A typical SIR system includes a housing, an air bag normally stored in the housing, and an inflator for discharging gas to inflate the air bag. Typically, the inflator is activated in response to a predetermined amount of vehicle deceleration.

It has also been suggested that a multiplicity of sensors, such as heat elements, video, infrared and radar or sonar type sensors, can be used to sense the presence, size, weight and sitting position of the occupant. It has been suggested that based on a summary of this multiplicity of sensor readings that the inflator can be signaled to discharge a predetermined amount of gas to inflate the air bag.

While the benefits of SIR systems are inherently desirable, there have been some suggested circumstances in which the SIR system may be disabled. For example, it is known to manually deactivate the passenger side SIR system in vehicles lacking a rear seat generally for placement of a rear facing infant seat in the front of the vehicle. The passenger side SIR system may be manually turned on or off by the vehicle occupant using a manual device utilizing the ignition key and located on the vehicle instrument panel.

SUMMARY OF THE INVENTION

This invention provides an alternative arrangement for disabling the SIR system from those which have been previously suggested. This invention provides a control for disabling an SIR system which is based on the physical position of the vehicle seat. This invention provides an on/off switch for the SIR system which is not manually controlled by the vehicle occupant, but instead is automatically controlled by the seat position. Thus, the SIR system is automatically enabled or disabled based upon the seat position chosen by each particular vehicle occupant. The invention provides a disabling system which may be utilized on either the driver or passenger side SIR system on a vehicle.

These alternatives and advantages are accomplished in the present invention by providing a disabling system for a supplemental inflatable restraint system in a vehicle. The disabling system includes a seat movable forward and rearward in the vehicle. The seat has a predetermined seat position. Preferably, the disabling system automatically disables the supplemental inflatable restraint system when the seat is moved forward of the predetermined seat position and automatically enables the supplemental inflatable restraint system when the seat is moved rearward of the predetermined seat position. In a preferred form of the invention, the predetermined seat position occurs when the seat is fully forward in the vehicle such that the supplemental inflatable restraint system is automatically disabled when the seat is at the fully forward position.

The disabling system preferably includes a switch movable between a triggered condition to deactivate the supplemental inflatable restraint system when the seat is forward of the predetermined seat position and an untriggered condition when the seat is rearward of the predetermined seat position to enable activation of the supplemental restraint system. Alternately, a sensor can be used for sensing the position of the seat relative to the predetermined seat position. The disabling system preferably includes diagnostics for determining if there is a fault in the switch or sensor and includes a telltale light which is lit when the fault in the switch or sensor is detected. Preferably, the disabling system also includes means for indicating when the supplemental inflatable restraint system is disabled, such as an indicator light indicating that the supplemental inflatable restraint system is currently disabled.

In accordance with other aspects of the invention, the vehicle includes a track and the seat includes a base movable along the track. The predetermined seat position occurs when the base of the seat is moved fully forward or nearly full forward in the track. The track and base have forward ends and the switch is preferably located on the forward ends of either the track or base.

BRIEF DESCRIPTION OF THE DRAWINGS

The invention will now be described, by way of example, with reference to the accompanying drawings in which.

DESCRIPTION OF THE PREFERRED EMBODIMENTS

Figure 1:
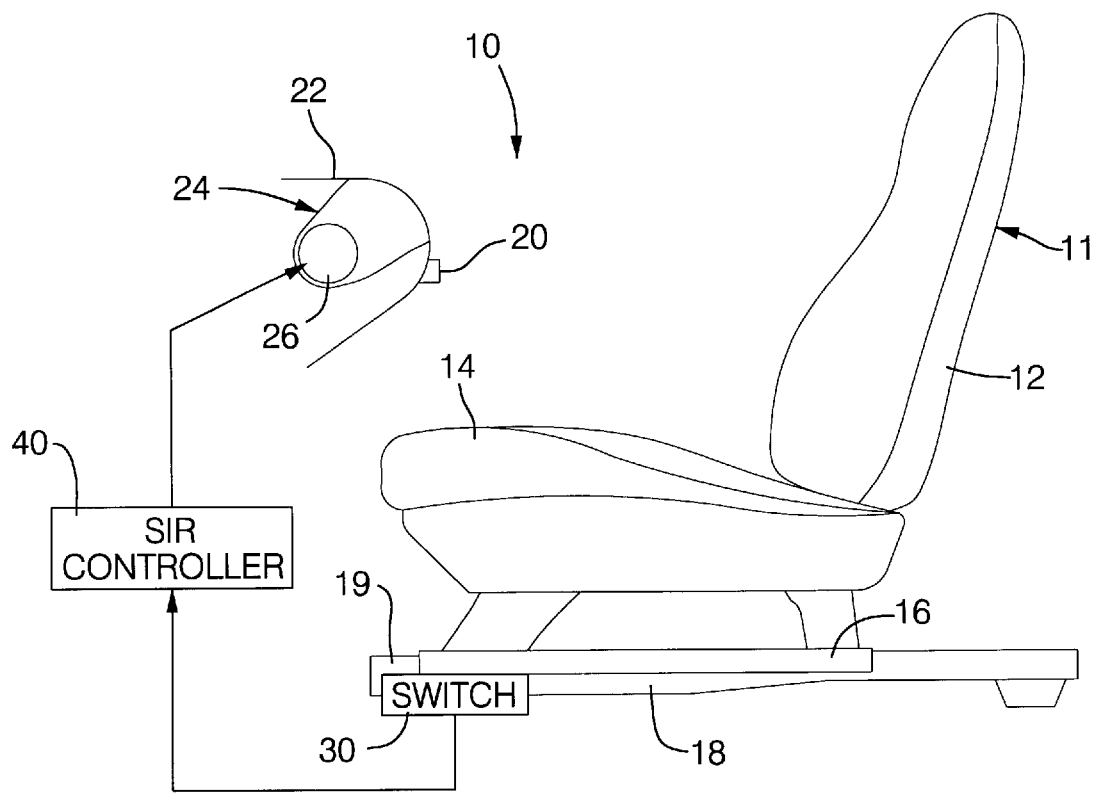
FIG. 1 shows a disabling system including a vehicle seat.

FIG. 1 shows the disabling system, generally designated as 10, including the seat 11 having a seat bottom 14 and a seat back 12. The seat 11 is mounted on a base 16 moveable on a seat track 18 which is fixedly mounted to the vehicle passenger compartment floor in a known manner. The seat 11 is movable in forward and rearward directions by sliding the base 16 along the track 18 either by a manual lever or by the manual operation of power seat controls. Thus, a vehicle occupant may position the seat 11 anywhere along the track 18. The seat 11 includes a predetermined forward seat position in which the base 16 of the seat 11 is moved a predetermined amount forward on the track 18. The predetermined forward seat position preferably occurs when the seat 11 is in the fully forward position or the nearly full forward position on the track 18. It will be appreciated that the predetermined forward seat position is dependent on each vehicle's geometry and whether the seat 11 is located on the driver or passenger side of the vehicle.

The vehicle includes an instrument panel 22 having an SIR system 24 mounted thereon. The SIR system 24 includes an inflatable air bag (not shown) which is inflated by discharging gas from the inflator 26 for protection of the occupant. The inflator 26 is activated upon receiving a signal indicating predetermined amounts of vehicle deceleration in the fore-aft direction. The disabling system 10 may be used to automatically deactivate the SIR system 24 based purely on the position of the seat 11 on the track 18. For example, when the seat 11 is at or forward of the predetermined forward seat position, the SIR system 24 is automatically deactivated to prevent deployment of the air bag. When the seat 11 is moved rearward of the predetermined forward seat position, then the SIR system 24 is automatically activated for enabling deployment upon sensing a predetermined amount of vehicle deceleration.

To accomplish this, the seat 11 includes a seat position switch 30 which provides an output signal indicative of the fore-aft position of the seat 11 including the base 16 with respect to the track 18. The seat position information from the switch 30 is continually monitored by the SIR controller 40. FIG. 1 shows a schematic of the disabling system 10. The switch 30 is located on one or both of the track 18 and seat 11. Preferably, the switch 30 is located near the forward end 19 of the track 18 or base 16. The switch 30 is movable to a triggered position when the seat 11 is at or forward of the predetermined forward seat position to provide an input signal to the SIR controller 40 that indicates that the SIR system 24 should be deactivated. The switch 30 is movable to an untriggered position when the seat 11 is rearward of the predetermined forward seat position to provide an input signal to the SIR controller 40 that indicates that the SIR system 24 should remain activated for deployment upon sensing a certain predetermined amount of vehicle deceleration.

Figure 2:
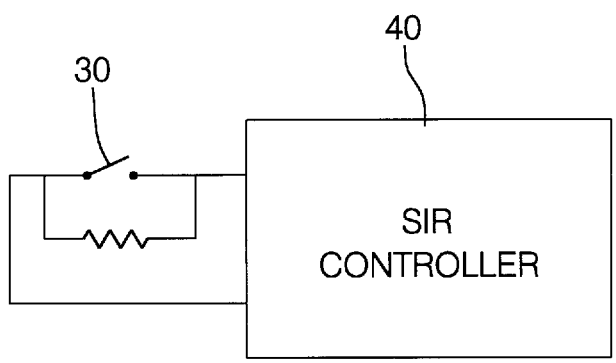
FIG. 2 shows an electrical schematic including a seat position switch.

The switch 30 may be of any suitable construction and an example of an electrical schematic for the disabling system 10 is shown in FIG. 2. The switch 30 is preferably triggered when the switch 30 is closed, indicative of the seat 11 being at or forward of the predetermined forward seat position. With the switch 30 closed, the SIR controller 40 is signaled to disable the SIR system 24 such that the air bag will not deploy upon sensing a predetermined amount of vehicle deceleration. When the switch 30 is in the untriggered, open position as shown in FIG. 2, the switch 30 indicates that the seat 11 is positioned rearward of the predetermined forward seat position and the SIR controller 40 maintains the SIR system 24 in the activated condition. When the SIR system 24 is in the activated condition, the air bag will be inflated upon sensing a predetermined amount of vehicle deceleration.

The switch 30 may be of any suitable type for automatic movement between a triggered or closed position to signal the SIR controller 40 to disable the SIR system 24 when the seat 11 is at or forward of the predetermined forward seat position and an untriggered or open position to signal the SIR controller 40 to enable the SIR system 24 when the seat 11 is rearward of the predetermined forward seat position. For example, the switch 30 may be a contact-type limit switch in which the SIR controller 40 is signaled to disable the SIR system 24 when the switch 30 is closed and contact is made. In this case, the switch 30 may include a contact portion which moves with the base 16 to make contact to close the switch 30. The switch 30 may alternately be a limit/toggle type switch which includes a lever movable between first and second positions by a projection carried on the base 16 as the base 16 moves forward and rearward on the track 18. The switch 30 may alternately be opened and closed as an element of the switch 30 moves in or out of a slot on the track 18. Yet another possibility is that the switch 30 may be opened or closed by contact with a protrusion carried on the base 16 as it moves. It will further be appreciated that the switch 30 could instead be a sensor activated by a voltage variation determined as the base 16 moves along the track 18. Thus, it will be appreciated that many different types of switches 30 and sensors may be used to monitor movement of the base 16 on the track 18 and thus the position of the seat 11.

Figure 6:
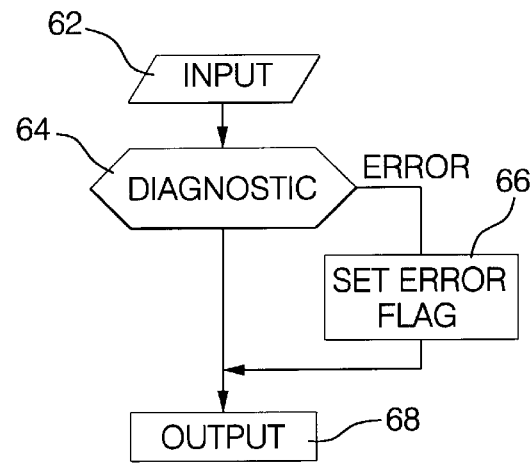
FIG. 6 illustrates the diagnostic control of the seat position switch and sensor.

As best shown in FIGS. 2 and 6, the SIR controller 40 also preferably includes diagnostics 64 to check for shorts and open circuits on the input 62 from the switch 30 to the SIR controller 40. As best shown in FIG. 6, if an error is found in the switch 30, a flag is set at block 66. The error flag is then output at block 68 as an input at block 52 of FIG. 3 to the SIR controller 40 along with the seat position, as will now be described.

Figure 3:
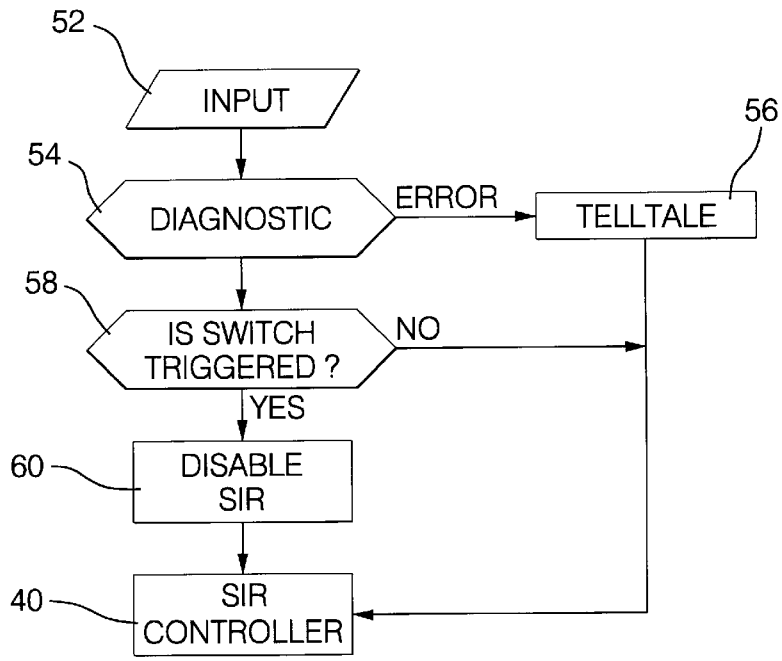
FIG. 3 illustrates a flow chart of the disabling system.

FIG. 3 generally illustrates the disabling system 10 for the SIR system 24 based on seat position. Block 52 receives the system input being the seat position signals from switch 30 and the diagnostic from block 68. Block 54 checks the diagnostic to determine if the error flag signal was set. If the error flag is set indicating a fault in the switch 30, then block 54 sets a command telling the SIR telltale light 56 to be illuminated, but preferably does not deactivate the SIR system 24. It is noted that a flashing telltale light 56 may be used to distinguish a seat switch 30 error from an error that would force deactivation of the SIR system 24. If an error was not detected, then block 58 checks whether the switch 30 is triggered indicating that the seat 11 is at or forward of the predetermined forward seat position. If the switch 30 is triggered, then block 60 sets a flag to tell the SIR controller 40 to disable the SIR system 24. If the switch 30 is not triggered, then the SIR controller 40 performs in its conventional manner and the SIR system 24 is activated.

In addition, it will be appreciated that an indicator light 20 may be included on the instrument panel 22 and is lit when the signal is sent to disable the SIR system 24 at block 60.

Figure 4:
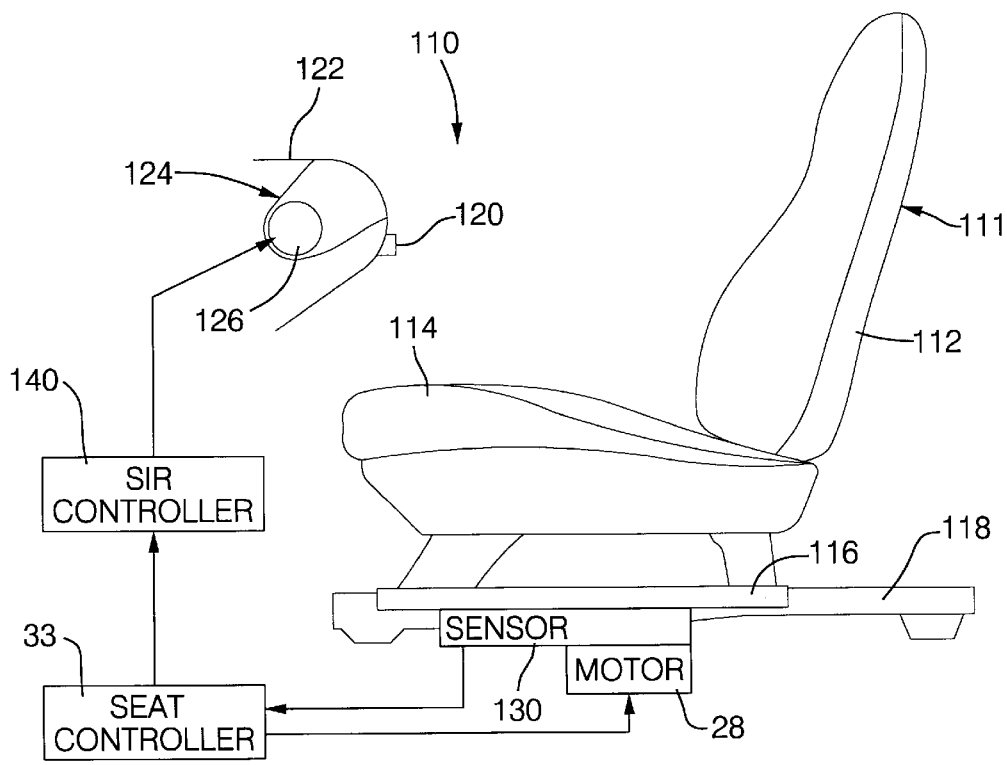
FIG. 4 shows an alternate embodiment of the disabling system.

FIG. 4 shows an alternate embodiment of the disabling system, generally designated as 110, including the seat 111 having a seat bottom 114 and a seat back 112. The seat 111 is mounted on a base 116 movable on a seat track 118 which is fixedly mounted to the vehicle passenger compartment floor. The seat 111 is movable in forward and rearward directions by sliding the base 116 along the track 118 by the operation of power seat controls assisted by one or more motors 28. Preferably, the disabling system 110 includes a seat controller 33 that continually monitors the fore/aft position of the seat 111. Preferably, the seat controller 33 is a memory seat module, of a known type, which remembers the position of the seat 111 for an occupant and resets the seat 111 to a preprogrammed position based on the occupant's seating preference. The seat controller 33 could alternately be part of a known type of a dash integration module. The seat 111 includes a predetermined forward seat position in which the base 116 of the seat 111 is moved a predetermined amount forward on the track 118, preferably being in the full forward or nearly full forward position.

The vehicle includes an instrument panel 122 having an SIR system 124 mounted thereon. The SIR system 124 includes an inflatable air bag (not shown) which is inflated by discharging gas from the inflator 126 for protection of the occupant. The inflator 126 is activated upon receiving a signal indicating predetermined amounts of vehicle deceleration in the fore-aft direction. When the seat 111 is at or forward of the predetermined forward seat position, the SIR system 124 is automatically deactivated to prevent deployment of the air bag. When the seat 111 is moved rearward of the predetermined forward seat position, then the SIR system 124 is automatically activated for deployment upon sensing a predetermined amount of vehicle deceleration.

Figure 5:
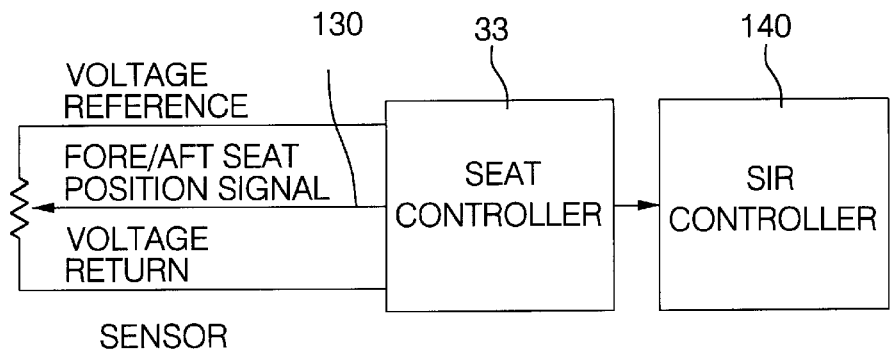
FIG. 5 shows an electrical schematic including a seat position sensor.

To accomplish this, the seat 111 includes a seat position sensor 130 which is continually monitored by the seat controller 33. Referring to FIG. 5, as the seat 111 moves along the track 118, the sensor 130 preferably senses a voltage level which indicates to the seat controller 33 the position of the seat 111 on the track 118. The seat controller 33 sends the seat position signal to the SIR controller 140 whenever the seat position changes. The SIR controller 140 is programmed to compare the position of the seat 111 from the seat position signal to a predetermined threshold value in a software algorithm. This check could alternately be performed by the seat controller 33. If the seat position is at or forward of the predetermined forward seat position, then the SIR controller 140 is signaled to disable the SIR system 124. If the seat position is rearward of the predetermined forward seat position, then the SIR controller 140 will enable the SIR system 124 to remain activated for air bag deployment upon sensing a predetermined amount of vehicle deceleration. FIG. 4 shows a schematic of the disabling system 110. The sensor 130 is preferably located along one or both of the track 118 and seat 111.

The sensor 130 may be of any suitable construction for sensing the position of the seat 111 along the track 118. An example of an electrical schematic of the disabling system 110 is shown in FIG. 5. The sensor 130 preferably measures a voltage level based on the seat position. The voltage level is calibrated to the seat position. When the seat controller 33 reads a voltage level less than a predetermined threshold value being indicative of the seat 111 being at or forward of the predetermined forward seat position, then the seat controller 33 signals to the SIR controller 140 to disable the SIR system 124 such that the air bag will not deploy. When the sensor 130 reads a voltage level greater than the predetermined threshold value and being indicative of the seat 111 being rearward of the predetermined forward seat position, then the seat controller 33 signals to the SIR controller 140 to activate the SIR system 124 for air bag deployment upon sensing a predetermined amount of vehicle deceleration. It will be appreciated that the sensor 130 need not be limited to a voltage-type sensor, but may be any sensor which indicates the position of the seat 111.

As best shown in FIG. 6, the seat controller 33 also preferably includes diagnostics 64 to check for shorts and open circuits in the input 62 from the sensor 130, similar to that for the switch 30 of the embodiment of FIGS. 1–3. As best shown in FIG. 6, if an error is found, a flag is set at block 66. The error flag is then output at block 68 as an input at block 152 of FIG. 7 to the SIR controller 140, as will now be described.

Figure 7:
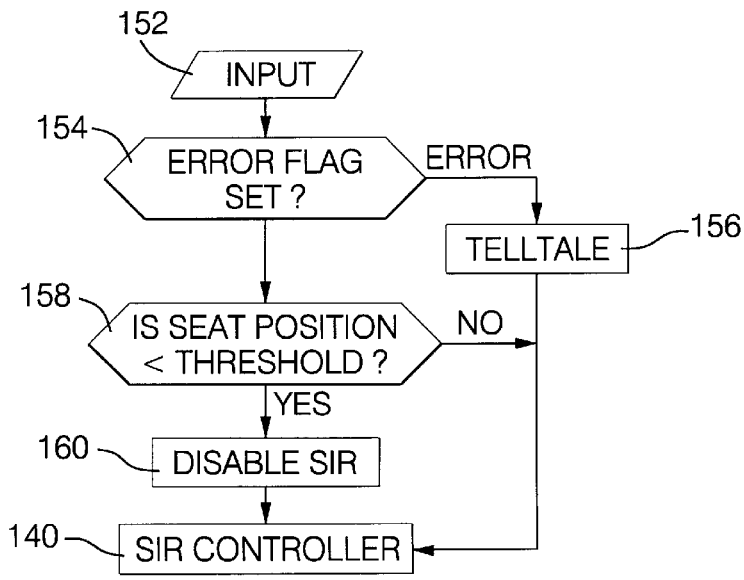
FIG. 7 illustrates a flow chart of the alternate disabling system.

FIG. 7 generally illustrates the disabling system 110 for the SIR system 124 based on seat position. Block 152 receives the system input being the seat position signal from seat controller 33 and the diagnostic from block 68. Block 154 checks the diagnostic to determine if the error flag was set. If the error flag is set indicating a fault in the sensor 130, then block 154 sets a command telling the SIR telltale light 156 to be illuminated, but preferably does not deactivate the SIR system 124. It is noted that a flashing telltale light 156 may be used to distinguish a sensor 130 error from an error that would force deactivation of the SIR system 124. Block 158 checks whether the seat position signal is less than a threshold voltage value indicative of the seat being at or forward of the predetermined forward seat position. If the voltage value is less than the predetermined threshold value indicating that the seat 111 is at or forward of the predetermined forward seat position, then block 160 sets a flag to tell the SIR controller 140 to disable the SIR system 124. If the voltage value is greater than the predetermined threshold voltage indicating that the seat 111 is rearward of the predetermined forward seat position, then the SIR system 124 is not disabled and the SIR controller 140 operates in its conventional manner.

In addition, it will be appreciated that an indicator light 120 may be included on the instrument panel 122 and is lit when the signal is sent to disable the SIR system 124 at block 160.

It will be appreciated that modifications may be made to the invention within the scope and spirit of the claims. For example, the SIR system 124 may alternately be deactivated when the voltage level is greater than the threshold voltage value and activated when the voltage level is less than the threshold voltage value. Also, any type of switch 30 or sensor 130 may be used to monitor the seat position and is not limited to those examples given. While the disabling system 10, 110 is illustrated on the passenger side of the vehicle, it will be appreciated that the disabling system 10, 110 could also be adapted to the driver's side of the vehicle. It will further be appreciated that the disabling system 10, 110 of the present invention could be used in conjunction with other SIR control systems. While it will be appreciated that when the seat 11, 111 is at or forward of the predetermined forward seat position, the SIR system 24, 124 is preferably deactivated, the SIR system 24, 124 could alternately be deactivated when the seat 11, 111 is forward of the predetermined seat position and activated when the seat 11, 111 is at or rearward of the predetermined forward seat position.

It will be appreciated that the present invention provides a disabling system 10, 110 for automatically disabling the SIR system 24, 124 based solely on the fore/aft position of the seat 11, 111. Advantageously, the SIR system 24, 124 is automatically enabled and disabled based on seat position and is not manually operated.

While the present invention has been described as carried out in specific embodiments thereof, it is not intended to be limited thereby but is intended to cover the invention broadly within the scope and spirit of the claims.

What is claimed is:

1. A disabling system for a supplemental inflatable restraint system in a vehicle, the disabling system comprising:
   a seat movable forward and rearward in the vehicle, the seat having a predetermined seat position;
   means for automatically disabling the supplemental inflatable restraint system when the seat is moved forward of the predetermined seat position and for automatically enabling the supplemental inflatable restraint system when the seat is moved rearward of the predetermined seat position.

2. The disabling system of claim 1 wherein the predetermined seat position occurs when the seat is fully forward in the vehicle and wherein the supplemental inflatable restraint system is automatically disabled when the seat is at the fully forward position.

3. The disabling system of claim 1 wherein the means includes a switch movable between a triggered condition to deactivate the supplemental inflatable restraint system when the seat is forward of the predetermined seat position and an untriggered condition when the seat is rearward of the predetermined seat position to enable activation of the supplemental restraint system.

4. The disabling system of claim 3 wherein the disabling system includes diagnostics for determining if there is a fault in the switch and wherein the disabling system includes a telltale light which is lit when the fault in the switch is detected.

5. The disabling system of claim 1 wherein the means includes a sensor for sensing the position of the seat relative to the predetermined seat position.

6. The disabling system of claim 5 wherein the disabling system includes diagnostics for determining if there is a fault in the sensor and wherein the disabling system includes a telltale light which is lit when the fault in the sensor is detected.

7. The disabling system of claim 1 wherein the disabling system includes means for indicating when the supplemental inflatable restraint system is disabled.

8. The disabling system of claim 7 wherein the means for indicating that the supplemental inflatable restraint system is disabled includes an indicator light indicating that the supplemental inflatable restraint system is currently disabled.

9. A disabling system for a supplemental inflatable restraint system in a vehicle, the disabling system comprising:

a seat movable forward and rearward in the vehicle, the seat having a predetermined seat position;

a switch which is movable between a triggered condition to deactivate the supplemental inflatable restraint system when the seat is at or forward of the predetermined seat position and an untriggered condition to permit activation of the supplemental restraint system when the seat is rearward of the predetermined seat position.

10. The disabling system of claim 9 wherein the vehicle includes a track and wherein the seat includes a base movable along the track and wherein the predetermined seat position occurs only when the base of the seat is moved fully forward in the track.

11. The disabling system of claim 10 wherein the track has a forward end and wherein the switch is located on the forward end of the track.

12. The disabling system of claim 10 wherein the base has a forward end and wherein the switch is located on the forward end of the base.

13. The disabling system of claim 9 wherein the vehicle includes a track and wherein the seat includes a base movable along the track and wherein the predetermined seat position occurs when the base of the seat is moved at least nearly fully forward in the track.

* * * * *